(12) United States Patent
Ma et al.

(10) Patent No.: US 6,256,151 B1
(45) Date of Patent: Jul. 3, 2001

(54) COMPACT MICRODISPLAY ILLUMINATION SYSTEM

(75) Inventors: Guolin Ma, Milpitas; Alan Marty, Menlo Park; Gani Jusuf, San Carlos, all of CA (US)

(73) Assignee: Agilent Technologies Inc., Palo Alto, CA (US)

( * ) Notice: Subject to any disclaimer, the term of this patent is extended or adjusted under 35 U.S.C. 154(b) by 0 days.

(21) Appl. No.: 09/604,891

(22) Filed: Jun. 28, 2000

(51) Int. Cl.$^7$ .................................................. G02B 27/14
(52) U.S. Cl. ........................................... 359/631; 359/636
(58) Field of Search .................................. 359/630, 631, 359/633, 634, 636

(56) References Cited

U.S. PATENT DOCUMENTS

| | | | |
|---|---|---|---|
| 5,585,946 | * 12/1996 | Chern | 349/5 |
| 5,596,451 | 1/1997 | Handschy et al. | |
| 5,808,800 | 9/1998 | Handschy et al. | |
| 5,900,976 | * 5/1999 | Handschy et al. | 359/495 |
| 6,023,253 | * 2/2000 | Taniguchi et al. | 345/7 |
| 6,078,363 | * 6/2000 | Masuda et al. | 348/752 |
| 6,147,805 | * 11/2000 | Fergason | 359/630 |

* cited by examiner

Primary Examiner—Ricky Mack

(57) ABSTRACT

A miniature display system has light source, display panel, polarized beam reflector film, curved reflector, and quarter wave film. The light source supplies light polarized in a first direction. The light from the light source reflects off the polarized beam reflector film and impinges the display panel. The polarized beam reflector film is configured to reflect light polarized in the first direction but pass the light polarized in a second direction orthogonal to the first direction. The display panel produces images on its surface ("display surface"). The light hitting the display panel is reflected orthogonally (polarized in a second direction) and bearing the image, thus bearing a pattern. The modulated light passes through the polarized beam reflector film and is reflected on a curved reflector. The quarter wave film is disposed between the polarized beam reflector film and the curved reflector. Thus, the modulated light, traversing from the polarized beam reflector film toward the curved reflector and back, is rotated 90 degrees, thereby becoming polarized in the first direction. Then rotated light reflects off the polarized beam reflector film toward viewing area The display system may also include conic mirror for reflecting light from the light source to the polarized beam reflector film The display panel may be transparent or semitransparent, and the light source may provide back lighting.

20 Claims, 7 Drawing Sheets

COMPACT MICRODISPLAY ILLUMINATION SYSTEM

BACKGROUND

The present invention relates to image display systems. In particular, the present invention relates to miniature image display system usable for helmet-mounted displays and other wearable applications.

In the field of miniature image display systems there are continuing challenges and drive to design smaller, lighter, and more energy efficient systems. These challenges stem from the fact that a miniature image display system should preferably be small enough and light enough to be wearable mounted on a helmet or on eyeglasses. And, preferably, the miniature image display system should be foldable for easy storage and transport. Such systems may be used for wearable computer systems, gaming systems, distance interactions between people or between people and machines, virtual-reality system, and for many other applications.

Typically, desktop computer systems and workplace computing equipment utilize CRT (cathode ray tube) display screens to display images for a user. The CRT displays are heavy, bulky, and not easily miniaturized. For a laptop, a notebook, or a palm computer, flat-panel display is typically used. The flat-panel display may use LCD (liquid crystal displays) technology implemented as passive matrix or active matrix panel. The passive matrix LCD panel consists of a grid of horizontal and vertical wires. Each intersection of the grid constitutes a single pixel, and is controlled by a LCD element. The LCD element either absorbs or reflects light depending upon orientation of the pixel. In fact, using quarter wave plates, flat-panel displays reflect light that is 90 degrees rotated from the incident light. That is, when light polarized in a first direction hits the flat panel and reflects off its pixels, the reflected light is polarized in a second, orthogonal direction.

The flat-panel display typically requires external lighting to allow human eyes to see the images displayed on the display panel. This is because flat-panel displays do not generate their own light. For laptop, notebook, or palm computers, the external lighting is typically positioned at the back of the flat-panel. The backlighting allows the user to see the images from the front of the flat-panel.

The flat-panels are also used for miniature image display systems because of their compactness and energy efficiency compared to the CRT displays. For miniature image display systems, reflective lighting, rather than the backlighting, is preferred. This is because, using the reflective lighting technique, miniature image display systems can be designed having higher energy efficiency compared to the energy efficiency of image display systems designed using the backlighting techniques. Various configurations of miniature display systems using flat-panels displays and reflective lighting technique can be found in U.S. Pat. No. 5,808,800.

To further increase the energy efficiency, use of polarizing beam splitting cube ("PBS cube") has been proposed. However, the PBS cube comes at a price in terms of weight and bulk. Installation of the PBS cube within the miniature image display system introduces additional weight and bulk to the system Typically, the PBS cube occupies majority of the space of the miniature image display system. And, because of the PBS cube, the miniature image display system cannot be folded for easy storage or transport. Furthermore, the energy efficiency gain is limited because each time light enters or exits the PBS cube, the light is attenuated, thus losing energy. Configurations of miniature display systems using the PBS cube can be found in U.S. Pat. No. 5,596,451.

Therefore, there still exists continuing need for more compact, lightweight, energy efficient, and foldable miniature display system usable for helmet mounted or otherwise wearable display applications.

SUMMARY

These needs are met by the present invention. According to one aspect of the present invention, a display system has light source, polarized beam reflector film (PBRF), display panel, quarter wave film, and curved reflector. Polarized light from the light (first direction) source reflects off the PBRF toward the display panel. The display panel modulates, rotates, and reflects the light. The modulated light is now rotated (second direction), so it passes through the PBRF toward the quarter wave film and curved reflector. The quarter wave film and curved reflector are situated such that the modulated light rotated back to the first direction and reflected back toward the PBRF. Since the modulated light is not in the first direction, the modulated light is reflected by the PBRF for viewing.

According to a third aspect of the present invention, a display system includes a light source supplies light polarized in a first direction. A display panel produces image on its surface ("display surface") such that when the light polarized in the first direction reflects on the display surface, modulated light results wherein the modulated light bears the image and is polarized in a second direction, the second direction being orthogonal to the first direction. A polarized beam reflector film (PBRF) passes light polarized in the first direction but reflects light polarized in the second direction The polarized beam reflector film has a first side and a second side opposite the first side and placed between the light source and the display panel. A curved reflector faces the first side of the polarized beam reflector film for reflecting the modulated light. A quarter wave film disposed between the polarized beam reflector film and the curved reflector. The modulated light passing through the polarized beam reflector film passes through the quarter wave film and is rotated by the quarter wave film, first rotation occurring when the modulated light from the display panel passes through the quarter wave film to reach the curved reflector resulting in quarter-rotated modulated light, second rotation occurring when the quarter rotated modulated light reflecting from the curved reflector passes through the quarter wave film to reach the polarized beam reflector film thus resulting in half-rotated modulated light, the half-rotated modulated light is in the first direction and reflects on the polarized beam reflector film for viewing.

According to a third aspect of the present invention, conic mirror may be added to concentrate the light from the light source to the polarized beam reflector.

According to a fourth aspect of the present invention, a display system includes a light source for supplying back lighting for a display panel, the back light polarized in a first direction and modulated by passing through the display panel. A polarized beam reflector film (PBRF) allows the modulated light to pass the PBRF toward a quarter wave plate and a curved reflector. The quarter wave plate and the curved reflector operating to rotate the modulated light to light polarized in a second direction and directing the rotated light toward the PBRF such that the rotated light is reflected off the PBRF toward an imaging area.

Other aspects and advantages of the present invention will become apparent from the following detailed description, taken in conjunction with the accompanying drawings,

DETAILED DESCRIPTION

Figure 1:
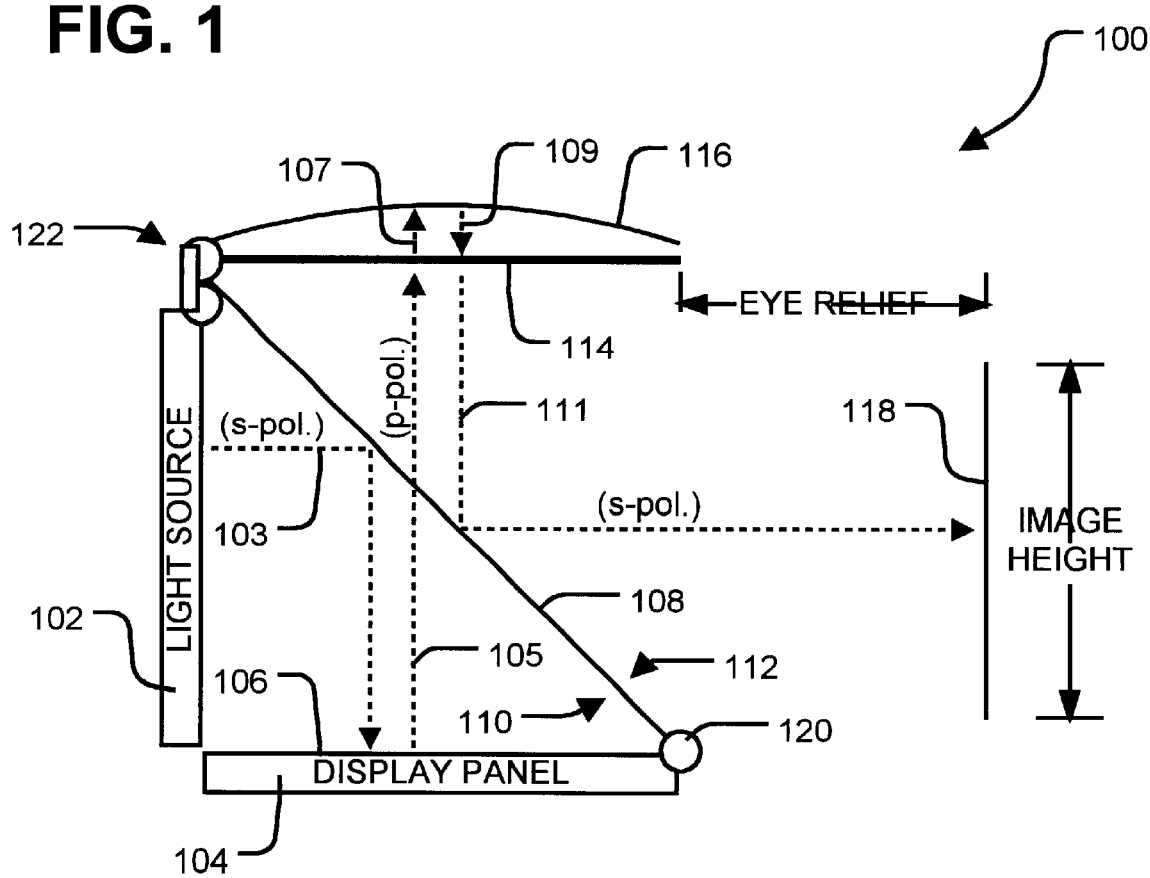
FIG. 1 is a sectional side view of a first embodiment of a display system of the present invention.

As shown in the drawings for purposes of illustration, the present invention is embodied in a display system having light source, polarized beam reflector film (PBRF), display panel, quarter wave film, and curved reflector. Because the present invention utilizes the PBRF, energy efficiency is gained and weight reduction is realized. And, because the PBRF is a film, components of the present system may be pivotally attached such that the components can be folded for easy storage and transport. The pivotal attachments may be implemented as hinges or other engagement devices.

In the following detailed description and in the several figures of the drawings, like elements are identified with like reference numerals.

FIG. 1 shows a sectional side view of a first embodiment of a display system of the present invention. Referring to FIG. 1, a miniature display system 100 includes a light source 102 for supplying light polarized in a first direction. The light source 102 may be configured to supply light polarized in a particular linear direction, for example s-polarized light. The s-polarized light from the light source 102 is illustrated by line 103. Line 103 and other lines used below to illustrate direction of light are only used for clarity of discussion and are not intended to represent ray traces as is commonly used in the art of optics.

The display system 100 also includes display panel 104 for producing images on its surface ("display surface") 106 such that when the s-polarized light 103 from the light source 102 hits the display surface 106, the s-polarized light 103 is modulated in accordance with the image on the display surface 106. When the incident light 103 hits imaging pixels on the display surface 106, the incident light 103 is rotated 90 degrees to a second polarization direction. The display surface 106 may also be configured to reflect and modulate the s-polarized light 103 into p-polarized light 105. The p-polarized light 105 is light polarized in the second direction that is orthogonal to the direction of the s-polarized light 103.

The light source 102 may be one or more light emitting diodes (LEDs). Alternatively, the light source 102 may be a fluorescent light sources such as a rod shaped light source or other type of light sources that produces sufficient amount and type of light to illuminate display panel 104. Type and color of the light source 102 and its intensity may vary depending on different applications.

The display panel 104 may be transmissive or reflective micro LCD (Liquid Crystal Display). Size of the display panel 104 depends on desired pixel size and resolution. In a preferred embodiment, the display panel 104 has a VGA format with 480×640 pixels at 5 μm per pixel. As technology improves, it is foreseeable that the resolution of the display panel 104 is likely to increase. Alternatively, the display panel may be a light valve in which the liquid crystal material is used.

The polarized beam reflector film 108 may be off the shelf polarizing beam splitter or thin film coating that reflect one state of the polarization and passes the other state. Size of the polarized beam reflector film (PBRF) 108 depends on the panel size. Basic function of the polarized beam reflector film 108 is to pass one type of the polarization state and reflect the other. For example, dual brightness enhancing film (DBEF) made by 3M® may be used. Alternatively, any film that passes light having one state of the polarization and absorbs or reflects light having another state of the polarization may be used.

Polarized beam reflector film 108 has a first side 110 and a second side 112 opposite the first side 110. In a preferred embodiment, the polarized beam reflector film 108 reflects light polarized in the first direction, s-polarized light, but allows light polarized in the second direction, p-polarized light to pass. Preferably, the polarized beam reflector film 108 is placed such that the first side 110 faces the light source 102 and the display panel 104 at an angle such that the s-polarized light 103 from the light source 102 reflects off of the polarized beam reflector film 108 and is directed toward the display surface 106.

As discussed, the s-polarized light 103 is reflected, modulated, and rotated by the display surface 106 resulting in modulated p-polarized light 105. The modulated p-polarized light 105 is reflected back to the polarized beam reflector film 108. The polarized beam reflector film 108 does not impede the reflected modulated p-polarized light 105 as the light 105 passes through the polarized beam reflector film 108 toward quarter wave film 114 and curved reflector 116.

In a preferred embodiment, the curved reflector 116 faces the second side 112 of the polarized beam reflector film 108 at an angle to reflect the reflected p-polarized light 105 back to the polarized beam reflector film 108. Preferably, the quarter wave film 114 is placed between the polarized beam reflector film 108 and the curved reflector 116. Therefore, the reflected p-polarized light 105 passing through the polarized beam reflector film 108 passes through the quarter wave film 114 to reach the curved reflector 116. During this first pass through of the quarter wave film 114, the reflected p-polarized light 105 is quarter-rotated. That is, during the first pass-through, the reflected p-polarized light 105 is rotated forty-five (45) degrees, resulting in quarter wave-rotated modulated light 107. The quarter wave-rotated modulated light 107 reflects off the curved reflector 116 and is directed back toward the polarized beam reflector film 108. On the way back to the polarized beam reflector film 108, now reflected quarter wave-rotated modulated light 109 passes through the quarter wave film 114. During this second pass through the quarter wave film 114, the reflected quarter wave-rotated modulated light 109 is rotated 45° again. That is, during the second pass-through, the reflected quarter wave-rotated modulated light 109 is rotated forty-five (45) degrees, resulting in a half wave-rotated modulated light 111. The half rotation (90 degrees) results in the light 111 being s-polarized.

The half wave-rotated modulated light 111 is the result of the modulated p-polarized light 105 passing through the quarter wave film 114 twice. The half wave-rotated modulated light 111 is now s-polarized and is orthogonally polarized relative to the reflected modulated p-polarized light 105. Accordingly, the half wave-rotated modulated light 111 is reflected by the polarized beam reflector film 108 toward imaging area 118. Additional optics may be placed in the imaging area 118. Size of the imaging area 118, or the image height, can be adjusted by adjusting concavity of the curved reflector 116. Preferably, the image height 118 is larger than human pupil size of around five mm Moreover, depending on the application, the image height 118 may be much larger.

The quarter wave film 114 may be an optical element which introduces a relative phase shift of $\pi/2$ between the constituent orthogonal p and s components of a light wave. Preferably, it has the properties that when linearly polarized light passes through it, the light changes to circularly polarized light. Similarly, an incoming circularly polarized beam will emerge as linearly polarized light. The film 114 may be typical quarter wave film made with bi-referengence material or with coat layers of thin film on a glass substrate.

The curved reflector 116 is preferably a polarization-maintaining reflector such as a mirror and does not affect the polarization. Size of the reflector 116 is defined by size of the panel 104 and magnification requirement.

Figure 2:
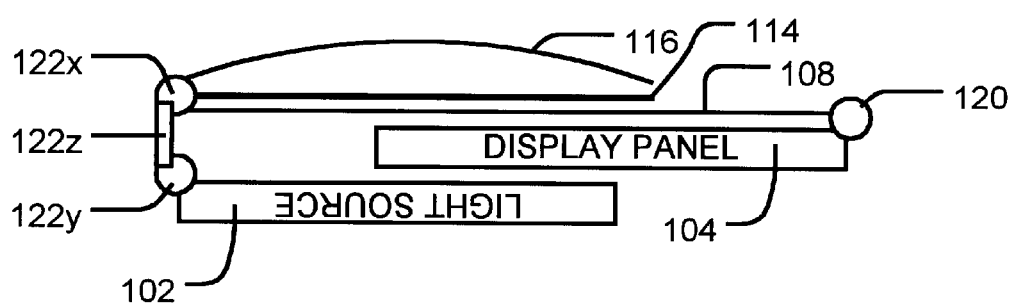
FIG. 2 illustrates the display system of FIG. 1 in folded position.

FIG. 2 illustrates the display system 100 of FIG. 1 in a folded position. Continuing to refer to FIG. 1 but also referring to FIG. 2, the display panel 104 may be pivotally attached to one end, a first end, of the polarized beam reflector film 108 using a hinge 120, a first hinge. The first hinge 120 allows the display panel 104 to be folded, or collapsed, toward the first side 110 of the polarized beam reflector film 108. A second hinge 122 may be used to pivotally attach the light source 102 to another end, second end, of the polarized beam reflector film 108. The second hinge 122 may allow the light source 102 to be folded, or collapsed, toward the first side 110 of the polarized beam reflector film 108. The second hinge 122 may also pivotally attach the curved reflector 116 and the quarter wave film 114 to the second end of the polarized beam reflector film 108. Then the second hinge 122 allows the curved reflector 116 and the quarter wave film 114 to be folded, or collapsed, toward the second side 112 of the polarized beam reflector film 108. To accommodate the display panel 104 when folded, the second hinge 122 may include a first subhinge 122$x$, a second sub-hinge 122$y$, and a hinge connector 122$z$.

Figure 3:
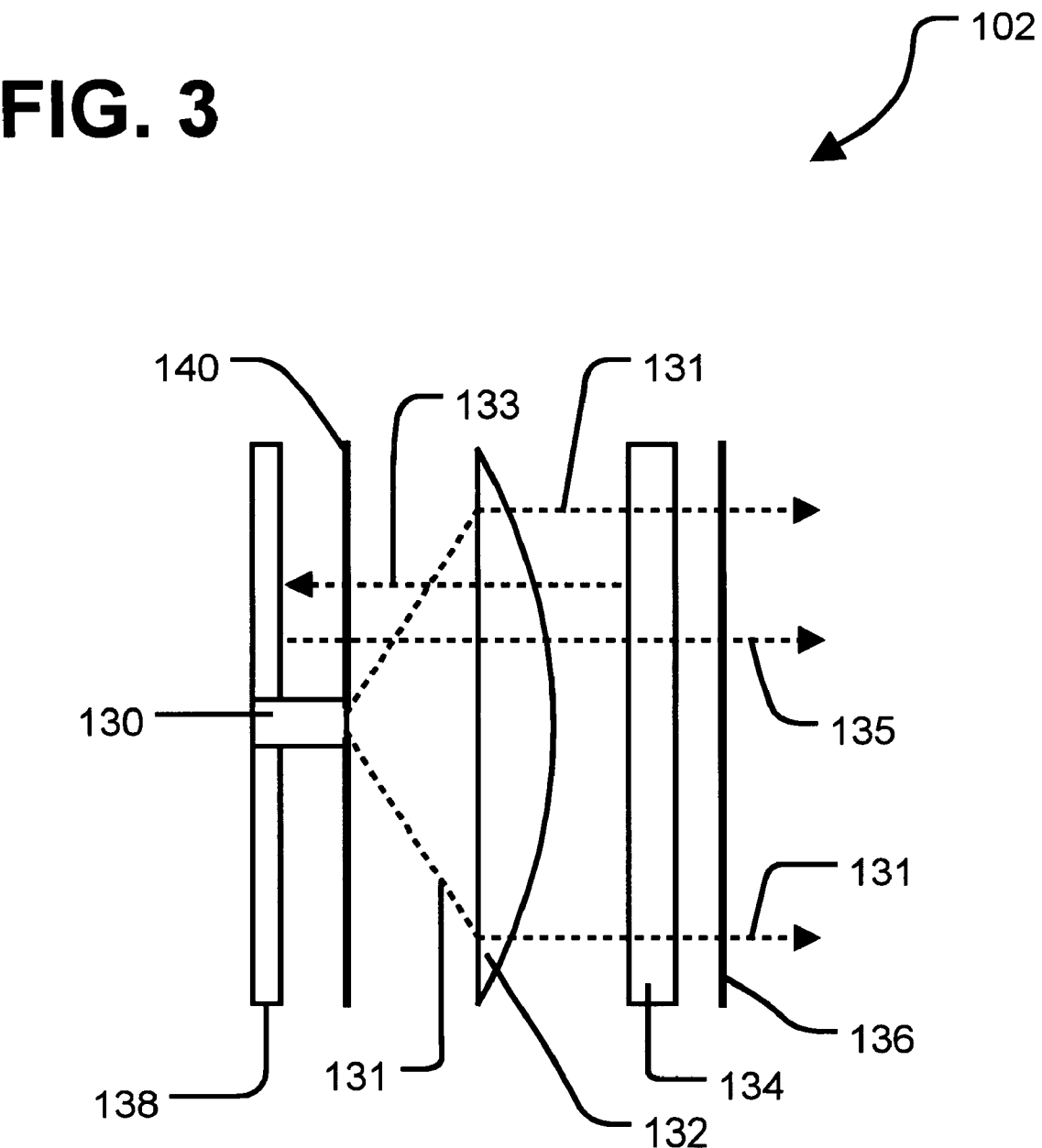
FIG. 3 is a sectional side view of one embodiment of a light source of the present invention.

As illustrated in FIG. 2, the display system 100 of the present invention may be foldable into a very compact form, greatly enhancing the ease of storage and transport of the system FIG. 3 is a sectional side view of one embodiment of the light source 102 of the present invention. The light source 102 may include a light-emitting element 130 for preferably emitting balanced light 131. Balanced light is light that is diffused, concentrated, and polarized. The light element 130 may be a light-emitting diode, VCSEL, laser, fluorescent, or even light bulb.

The emitted light 131 may be concentrated by a collimator 132 and diffused by a diff-user 134. The emitted light 131 may not be concentrated. By using the collimator 132, the emitted light 131 can be concentrated to a size sufficient to illuminate a display panel, hence higher light efficiency. Moreover, the emitted light 131 may not be uniform The diffuser 134 diffuses the light 131 so imaging on the display panel will have no bright spot. The collimated and diffused light is then filtered by a polarizing filter 136 to allow a portion of the light, for example, s-polarized light, to pass while reflecting p-polarized light 133 back toward a recapture mirror 138 to depolarize and recycle. A quarter wave film 140 is disposed between the polarizing filter 136 and the recapture mirror 138 to cause the reflected p-polarized light 133 to rotate such that after reflecting from the recapture mirror 138 and passing through the quarter wave film 140 for the second time, the p-polarized light 133 is converted to s-polarized light 135.

Figure 4:
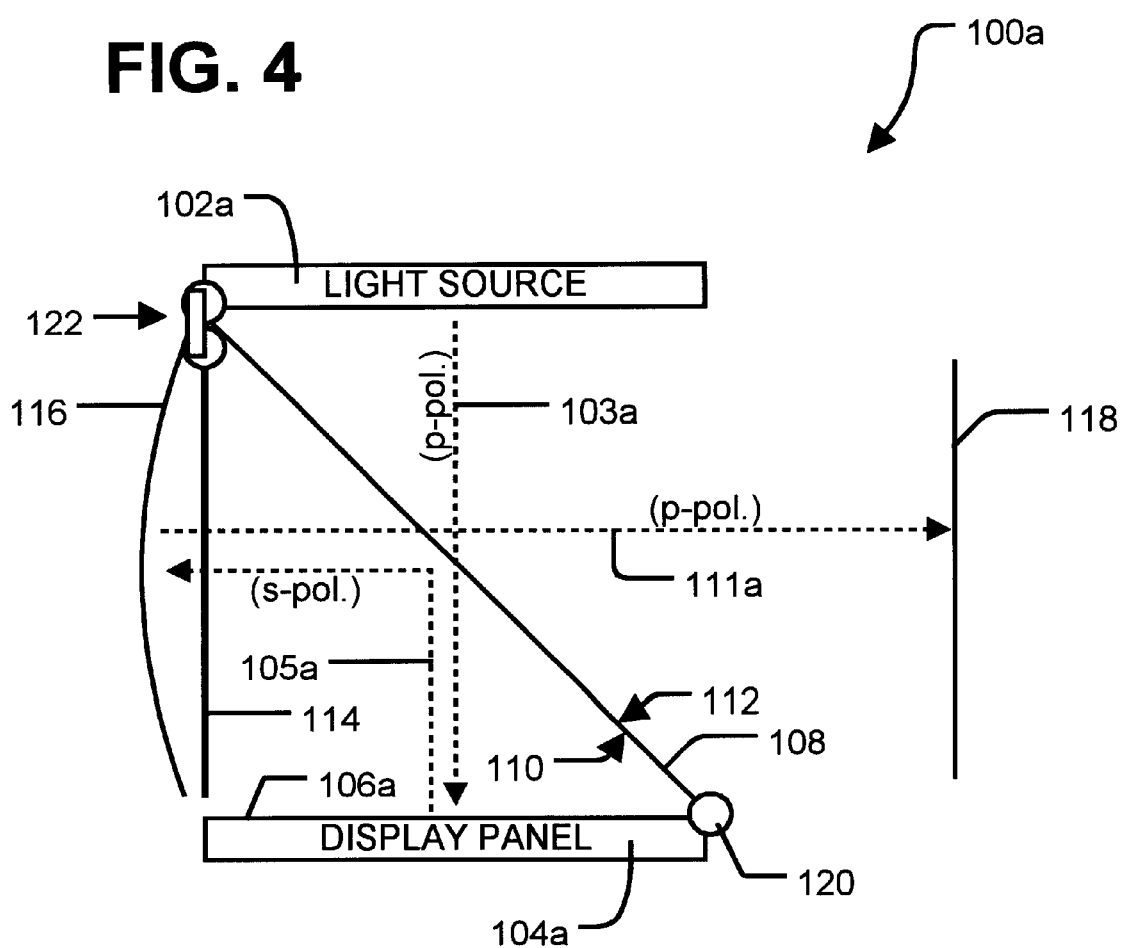
FIG. 4 is a sectional side view of a second embodiment of a display system of the present invention.

An embodiment of the present invention having certain alternate configuration is shown in FIG. 4. Portions of this embodiment are similar to those shown in FIG. 1. For convenience, components in FIG. 4 that are similar to components in FIG. 1 are assigned the same reference numerals, analogous components are assigned the same reference numerals accompanied by letter "a," and different components are assigned different reference numerals.

FIG. 4 illustrates a sectional side view of a second embodiment of a display system of the present invention. Referring to FIG. 4, a miniature display system 100$a$ includes a light source 102$a$ for supplying p-polarized light (the "first direction" for the purposes of discussing the second embodiment 100$a$). The p-polarized light from the light source 102$a$ is illustrated by line 103$a$.

The p-polarized light 103$a$ from the light source 102$a$ passes through polarized beam reflector film 108 having a first side 110 and a second side 112 and reflects off display surface 106$a$ of the display panel 104$a$. When the p-polarized light 103$a$ from the light source 102$a$ hits the display surface 106$a$, the p-polarized light 103$a$ is illuminated on the display surface 106$a$. The display surface 106$a$ may also be configured to reflect and modulate the p-polarized light 103$a$ into modulated s-polarized light 105$a$. The modulated s-polarized light 105 is light polarized in a second direction for the purposes of the second embodiment 100$a$. The second direction, s-polarization, is orthogonal to the direction of the p-polarized light 103$a$.

The first side 110 of the polarized beam reflector film 108 faces the display panel 104$a$ at an angle such that the modulated s-polarized light 105$a$ from the display panel 104$a$ reflects off the polarized beam reflector film 108 toward curved reflector 116, also facing the first side 110 of the polarized beam reflector film 108.

Quarter wave film 114 may be disposed between the polarized beam reflector film 108 and the curved reflector 116. The result is that the modulated s-polarized light 105$a$ passes through the quarter wave film 114 twice: first when traversing from the polarized beam reflector film 108 to the curved reflector 116 to be bounced back, and second when traversing from the curved reflector 116 to the polarized beam reflector film 108. The result of the modulated s-polarized light 105$a$ passing through the quarter wave film 114 twice is that the light is rotated 90 degrees half wave-rotated as result of two quarter wave rotations) to become p-polarized. The operations of the curved reflector 116 with the quarter wave film 114 are discussed above with respect to FIG. 1, and are not repeated here.

Finally, the half wave-rotated modulated p-polarized light 111a passes through the polarized beam reflector film 108 to reach the imaging area 118. Again, size of the imaging area 118, or the image height, can be adjusted by adjusting concavity of the curved reflector 116.

Figure 5:
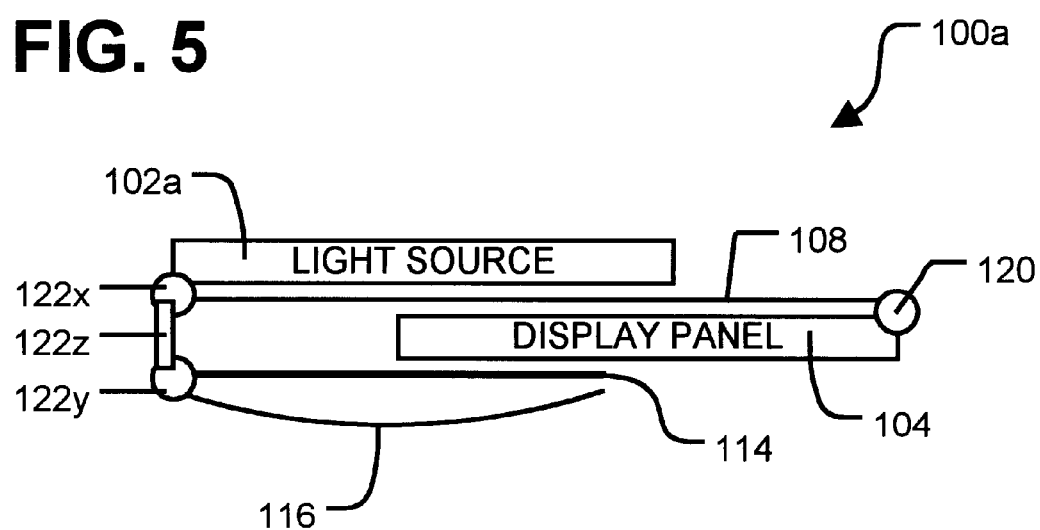
FIG. 5 illustrates the display system of FIG. 4 in folded position.

FIG. 5 illustrates the display system 100a of FIG. 4 in a folded position. Continuing to refer to FIG. 4 but also referring to FIG. 5, the display panel 104a may be pivotally attached to the first end of the polarized beam reflector film 108 using the first hinge 120. The first hinge 120 allows the display panel 104a to be folded, or collapsed, toward the first side 110 of the polarized beam reflector film 108. The second hinge 122 may be used to pivotally attach the light source 102a to the second end of the polarized beam reflector film 108. The second hinge 122 allows the light source 102a to be folded, or collapsed, toward the second side 112 of the polarized beam reflector film 108. The second hinge 122 also pivotally attaches the curved reflector 116 and the quarter wave film 114 to the second end of the polarized beam reflector film 108. The second hinge 122 may also allow the curved reflector 116 and the quarter wave film 114 to be folded, or collapsed, toward the first side 110 of the polarized beam reflector film 108. To accommodate the display panel 104a when folded, the second hinge 122 may include the first sub-hinge 122x, the second sub-hinge 122y, and the hinge connector 122z.

As illustrated in FIG. 5, the display system 100a of the present invention may be folded into a very compact form, greatly enhancing the ease of storage and transport of the system.

Figure 6:
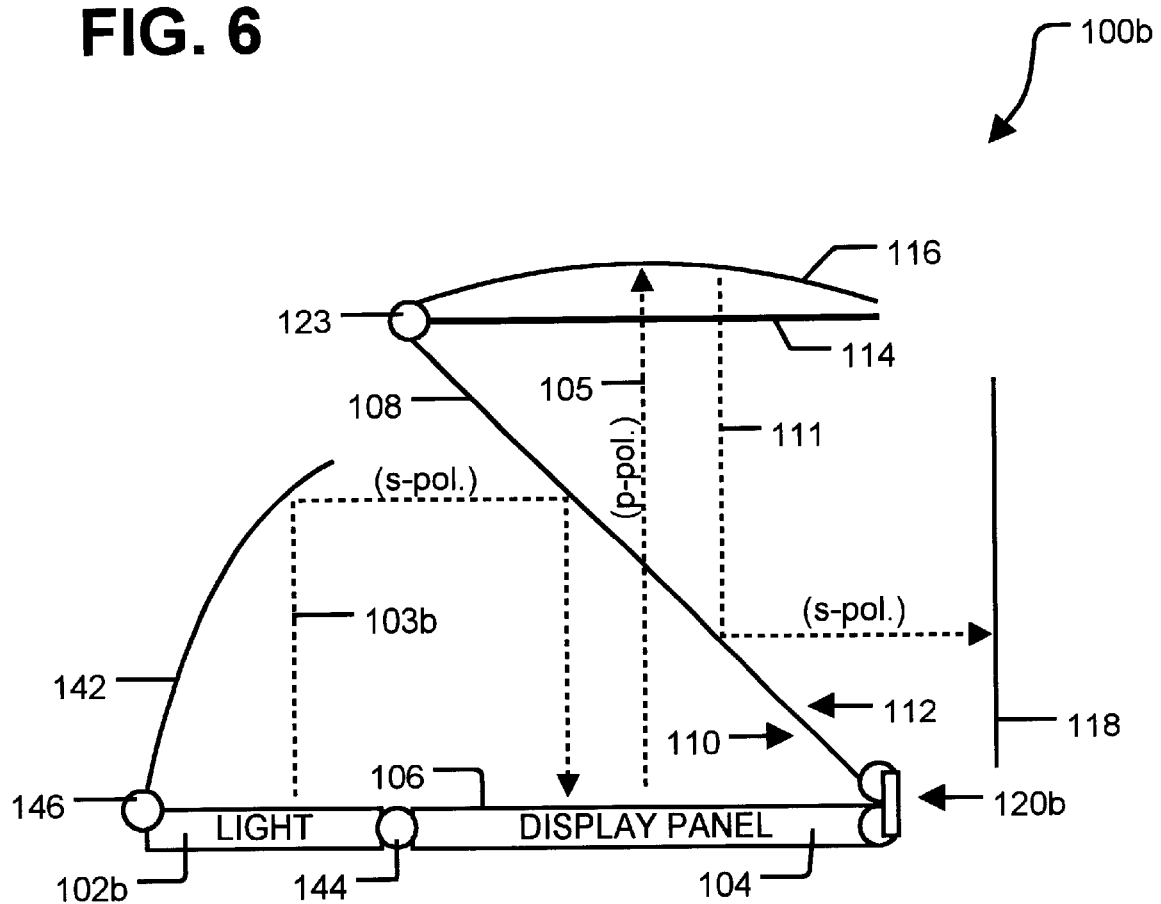
FIG. 6 is a sectional side view of a third embodiment of a display system of the present invention.

Another embodiment of the present invention having certain alternate configuration is shown in FIG. 6. Portions of this embodiment are similar to those shown in FIG. 1. For convenience, components in FIG. 6 that are similar to components in FIG. 1 are assigned the same reference numerals, analogous components are assigned the same reference numerals accompanied by letter "b," and different components are assigned different reference numerals.

FIG. 6 shows a sectional side view of a third embodiment of a display system of the present invention. Referring to FIG. 6, a miniature display system 100b includes a light source 102b for supplying s-polarized light (the "first direction" for the purposes of discussing the third embodiment 100b). The s-polarized light from the light source 102b is illustrated by line 103b.

Conic mirror 142 reflects the s-polarized light 103b from the light source 102b to polarized beam reflector film 108 which may be configured to reflect s-polarized light but pass p-polarized light. The polarized beam reflector film 108 reflects the s-polarized light 103b bouncing off the conic mirror 142 toward display panel 104.

Once the s-polarized light 103b reaches the polarized beam reflector film 108, the operations of the display system 100b are similar to the operations of the display system 100 of FIG. 1, and are not repeated here.

Figure 7A:
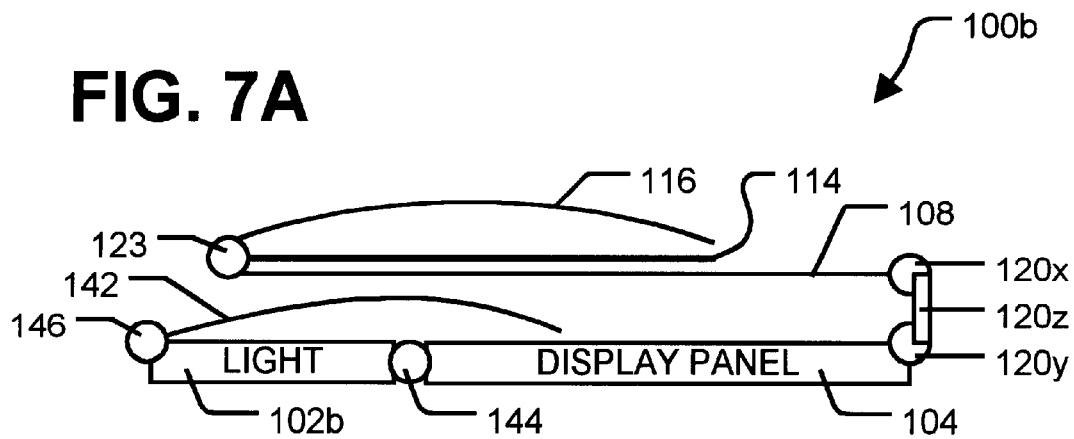
FIG. 7A illustrates the display system of FIG. 6 in folded position.
Figure 7B:
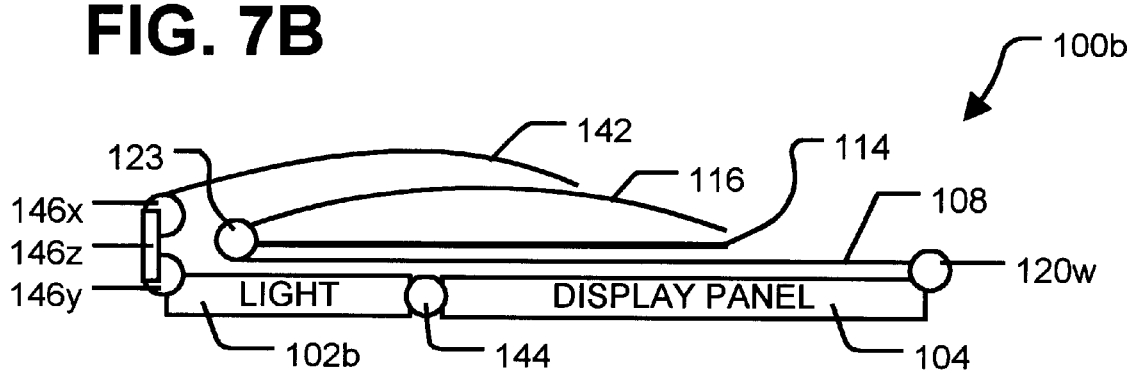
FIG. 7B illustrates the display system of FIG. 6 in an alternative folded position.
Figure 7C:
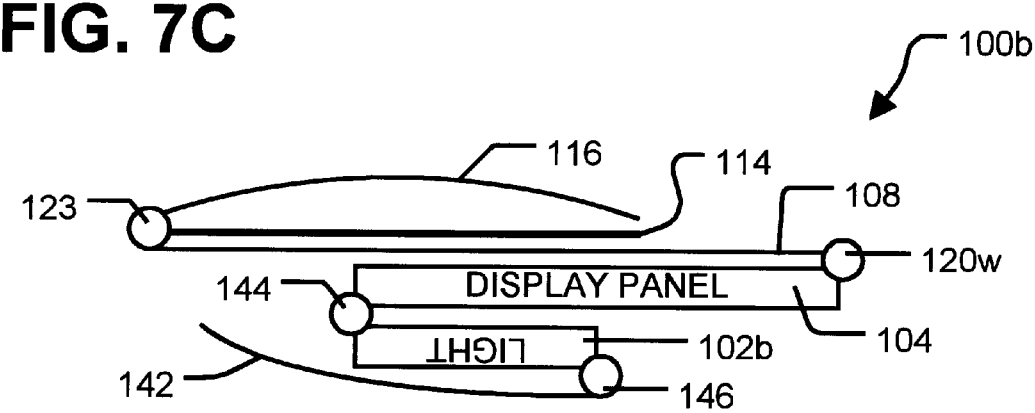
FIG. 7C illustrates the display system of FIG. 6 in another alternative folded position.

FIGS. 7A, 7B, and 7C illustrate the display system 100b of FIG. 6 in various folded positions. Continuing to refer to FIG. 6 but also referring to FIGS. 7A, 7B, and 7C, first end of the display panel 104 may be pivotally attached to the first end of the polarized beam reflector film 108 using a hinge 120b. The hinge 120b allows the display panel 104 to be folded, or collapsed, toward the first side 110 of the polarized beam reflector film 108. As illustrated in FIG. 7A, the hinge 120b may include two sub-hinges 120x and 120y and hinge connector 120z. This configuration allows sufficient room for the conic mirror 142 in folded state. The hinge 120b may be alternatively configured as a single hinge 120w as illustrated in FIG. 7B and 7C.

Another hinge 123 may be used to pivotally attach the curved reflector 116 and the quarter wave film 114 to the second end of the polarized beam reflector film 108. The hinge 123 allows the curved reflector 116 and the quarter wave film 114 to be folded, or collapsed, toward the second side 112 of the polarized beam reflector film 108.

A third hinge 144 may pivotally attach second end of the display panel 104 to first end of the light source 102b to allow the light source 102b and the display panel 104 to be folded as illustrated by FIG. 7C.

A fourth hinge 146 may pivotally attach second end of the light source 102b to the conic mirror 142. The hinge 146 may allow the conic mirror 142 to be folded toward light-emitting surface of the light source 102b. An alternative embodiment of the fourth hinge 146 is illustrated by FIG. 7B where the fourth hinge may include two sub-hinges 146x and 146y and hinge connector 146z.

Figure 8:
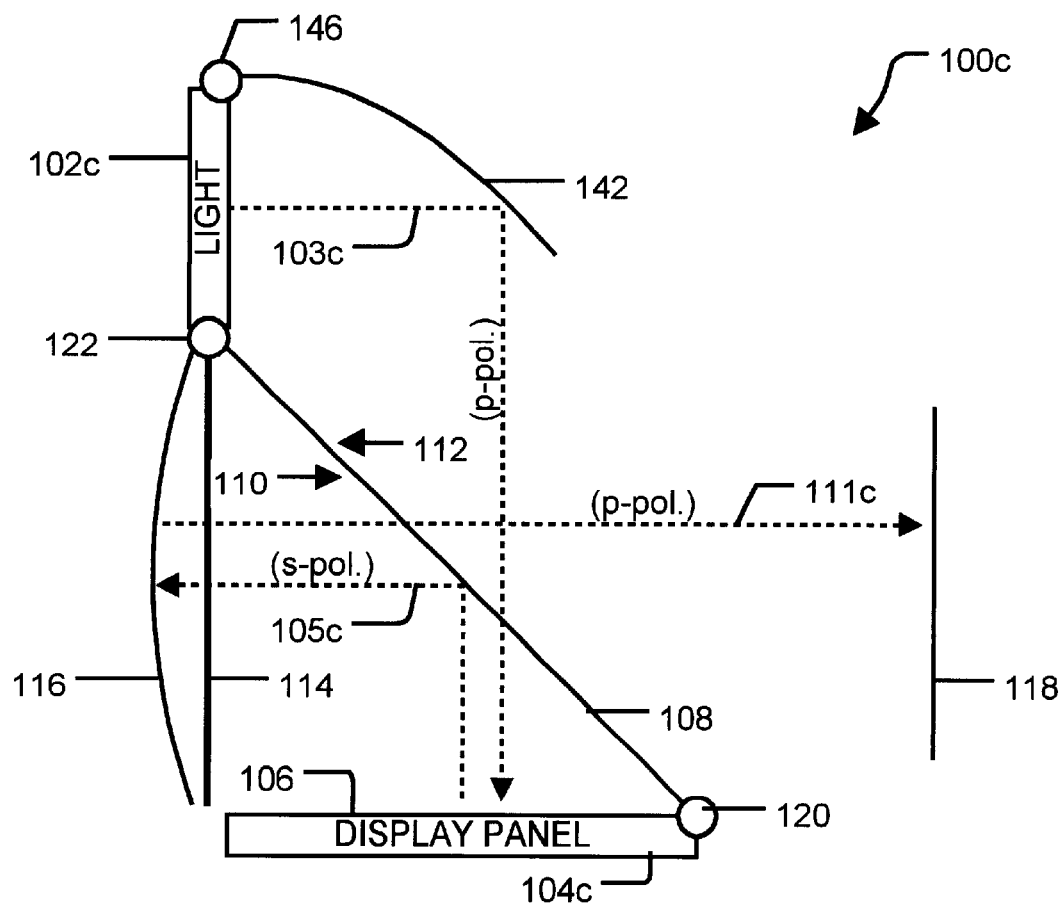
FIG. 8 is a sectional side view of a fourth embodiment of a display system of the present invention.

Yet another embodiment of the present invention having certain alternate configuration is shown in FIG. 8. Portions of this embodiment are similar to those shown in FIGS. 4 and 6. For convenience, components in FIG. 8 that are similar to components in FIGS. 4 or 6 are assigned the same reference numerals, analogous components are assigned the same reference numerals accompanied by letter "c," and different components are assigned different reference numerals.

FIG. 8 shows a sectional side view of a fourth embodiment of a display system of the present invention. Referring to FIG. 8, a miniature display system 100c includes a light source 102c for supplying p-polarized light (the "first direction" for the purposes of discussing the fourth embodiment 100c). The p-polarized light from the light source 102c is illustrated by line 103c.

Conic mirror 142 reflects the p-polarized light 103c from the light source 102c toward the display panel 104c via the polarized beam reflector film 108. The polarized beam reflector film 108 may be configured to reflect s-polarized light but pass p-polarized light. Here, the polarized beam reflector film 108 passes the p-polarized light 103c allowing the p-polarized light 103c to proceed to the display panel 104c where the p-polarized light 103c is reflected from the display panel, and is rotated to s-polarized light 105c. The s-polarized light 105c is light polarized in a second direction for the purposes of the fourth embodiment 100c. The second direction, s-polarization, is orthogonal to the direction of the p-polarized light 103c.

The s-polarized light 105 reflects off the polarized beam reflector film 108 toward the curved reflector 116, passing through the quarter wave film 114. After reflecting off the curved reflector 116, the light passes through the quarter wave film 114 again, thus being half wave-rotated. The half-wave-rotated modulated reflected light in p-polarization 111c passes through the polarized beam reflector film 108 to reach the imaging area 118. Again, size of the imaging area 118, or the image height, can be adjusted by adjusting concavity of the curved reflector 116.

Figure 9:
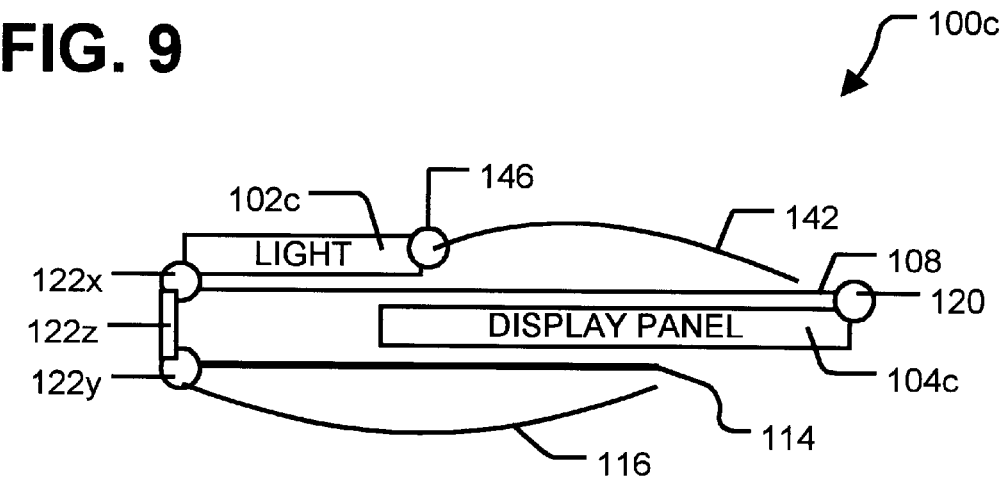
FIG. 9 illustrates the display system of FIG. 8 in folded position.

FIG. 9 illustrates the display system 100c of FIG. 8 in a folded position. Continuing to refer to FIG. 8 but also referring to FIG. 9, the display panel 104c may be pivotally attached to the first end of the polarized beam reflector film 108 using the hinge 120. The hinge 120 allows the display panel 104c to be folded, or collapsed, toward the first side 110 of the polarized beam reflector film 108. The second hinge 122 may be used to pivotally attach the light source 102c to the second end of the polarized beam reflector film 108. The second hinge 122 allows the light source 102c to be folded, or collapsed, toward the second side 112 of the polarized beam reflector film 108. The second hinge 122 may also pivotally attach the curved reflector 116 and the quarter wave film 114 to the second end of the polarized beam reflector film 108. Thusly attached, the second hinge 122 allows the curved reflector 116 and the quarter wave film 114 to be folded, or collapsed, toward the first side 110 of the polarized beam reflector film 108. To accommodate the display panel 104c when folded, the second hinge 122 may include the first sub-hinge 122x, the second sub-hinge 122y, and the hinge connector 122z.

As illustrated in FIG. 9, the display system 100c of the present invention may be folded into a very compact form, greatly enhancing the ease of storage and transport of the system.

Figure 10:
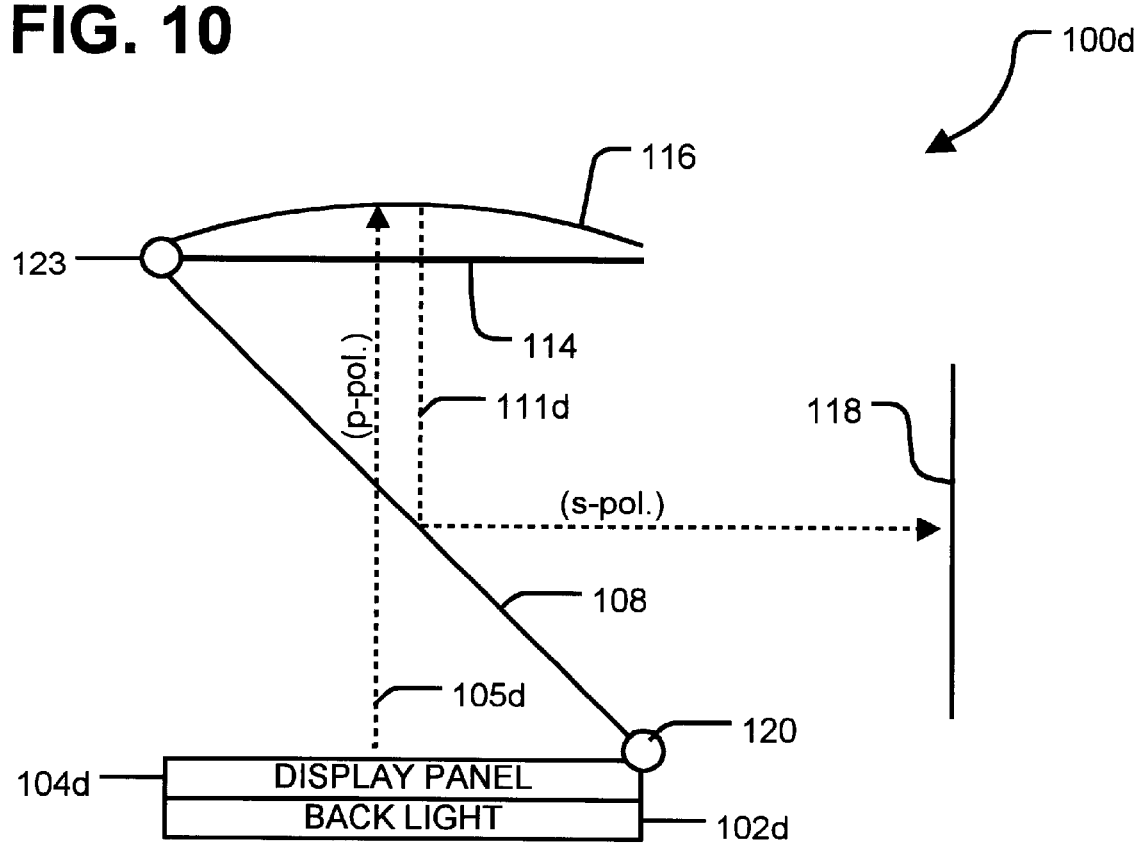
FIG. 10 is a sectional side view of a fifth embodiment of a display system of the present invention.

FIG. 10 is a fifth embodiment of the present invention having certain alternate configuration. Portions of this embodiment are similar to those shown in FIGS. 1 and 6. For convenience, components in FIG. 10 that are similar to components in FIGS. 1 or 6 are assigned the same reference numerals, analogous components are assigned the same reference numerals accompanied by letter "d," and different components are assigned different reference numerals.

FIG. 10 shows a sectional side view of a fifth embodiment of a display system of the present invention. Referring to FIG. 10, a miniature display system 100d includes a display 104d and a light source 102d providing back lighting for the display 104d. Similar to the light sources of previous figures, the light source 102d provides a diffused, polarized light in a first direction (p-polarization). Light from the light source 102d passes through the display 104d and is modulated by the display 104d. The modulated light 105d passes through the PBRF 108 toward the curved reflector 116. Operations of the curved reflector 116 and the quarter wave film 114 are discussed above. The modulated light 105d is rotated and reflected back toward the PBRF 108 as half-wave-rotated modulated reflected light 111d. The half-wave-rotated modulated reflected light 111d is directed to the PBRF 108 where it is reflected toward the imaging area 118. In this configuration, the display panel 104d is transparent or semi-transparent to allow light from the light source 102d to pass through the display panel 104d to be modulated by image generated on the display panel 104d.

Figure 11:
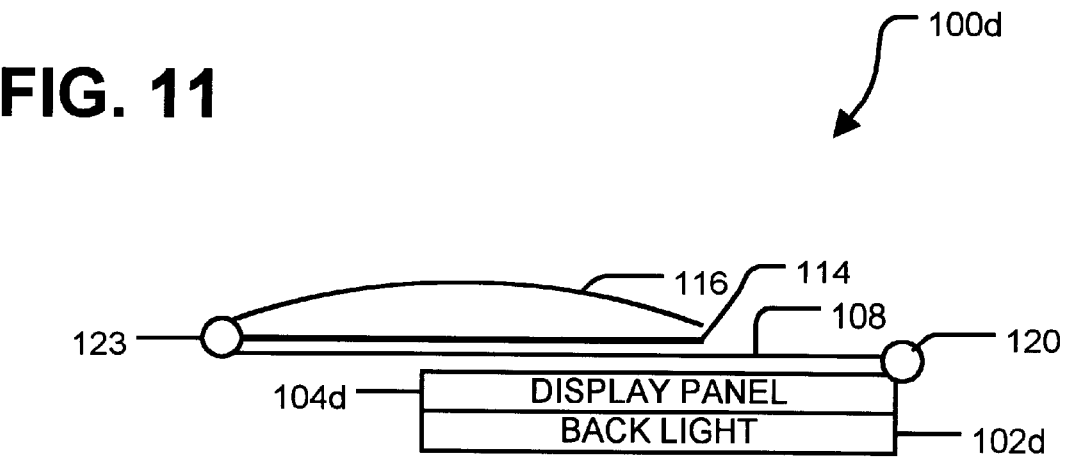
FIG. 11 illustrates the display system of FIG. 10 in folded position.

FIG. 11 illustrates the display system 100d of FIG. 10 in a folded position. Continuing to refer to FIG. 108 but also referring to FIG. 11, the display panel 104d may be pivotally attached to the first end of the polarized beam reflector film 108 using the hinge 120. The hinge 120 allows the display panel 104d to be folded, or collapsed, toward the polarized beam reflector film 108. Another hinge 123 may be used to pivotally attach the second end of the PBRF 108 to the curved reflector 116 and the quarter wave film 114. As illustrated in FIG. 11, the display system 100d of the present invention may be folded into a very compact form, greatly enhancing the ease of storage and transport of the system.

From the foregoing, it will be appreciated that the apparatus of the present invention is novel and offers advantages over the current art. The invention provides for miniature display system that is lighter, less bulky, and more energy efficient than the prior systems. Further, the miniature display system of the present invention is foldable for easy storage or transport.

Although several specific embodiments of the invention are described and illustrated above, the invention is not to be limited to the specific forms or arrangements of parts so described and illustrated. For example, the hinge for folding various portions of the miniature display may be implemented as rotating mechanism The present invention is limited only by the claims that follow.

What is claimed is:

1. A display system comprising:
    light source for supplying light polarized in a first direction;
    polarized beam reflector film (PBRF) reflecting the light polarized in the first direction toward a display panel;
    the display panel reflecting the reflected light polarized in the first direction, the light reflecting from the display panel being modulated and rotated polarized in a second direction by image on the display panel, the modulated rotated light being polarized in the second direction and passes through the PBRF to reach quarter wave film and curved reflector; and
    the quarter wave film and the curved reflector disposed to reflect and rotate the modulated rotated light to be polarized in the first direction resulting in a modulated light in the first direction reflected toward the PBRF to reflect off the PBRF for viewing.

2. The display system recited in claim 1 further comprising a conic mirror for directing the light from the light source to the polarized beam reflector film.

3. The display system recited in claim 1 wherein the light source comprises light-emitting element and polarizing filter.

4. The display system recited in claim 3 wherein the light source further comprises recovery mirror and quarter wave film to recapture light.

5. The display system recited in claim 1 wherein the light source comprises collimator and diffuser.

6. The display system recited in claim 1 wherein the display panel is reflective micro LCD.

7. The display system recited in claim 1 wherein the polarized beam reflector film has a first side and a second side, the first side facing the light source and the display panel to reflect the light polarized in a first direction from the light source toward the display panel.

8. The display system recited in claim 1 wherein the curved reflector is polarization-maintaining reflector.

9. The display system recited in claim 1 wherein the quarter wave film is disposed proximal to the curved reflector such that the modulated rotated light passing through the PBRF passes through the quarter wave film and is rotated by the quarter wave film, first rotation occurring when the modulated light from the display panel passes through the quarter wave film to reach the curved reflector resulting in quarter-rotated modulated light, second rotation occurring when the quarter-rotated modulated light reflecting from the curved reflector passes through the quarter wave film to reach the polarized beam reflector film thus resulting in half-rotated modulated light, the half-rotated modulated light in the first direction.

10. The display system recited in claim 1 wherein the quarter wave film is an optical element that introduces a relative phase shift of $\pi/2$ in polarization of light passing through the quarter wave film.

11. A display system comprising:
    light source for supplying light polarized in a first direction;
    display panel for producing image on its surface ("display surface") such that when the light polarized in the first direction reflects on the display surface, modulated light results wherein the modulated light bears the image and is polarized in a second direction, the second direction being orthogonal to the first direction;

polarized beam reflector film passing light polarized in the first direction but reflecting light polarized in the second direction, the polarized beam reflector film having a first side and a second side opposite the first side and placed between the light source and the display panel;

curved reflector facing the first side of the polarized beam reflector film for reflecting the modulated light; and quarter wave film disposed between the polarized beam reflector film and the curved reflector such that the modulated light passing through the polarized beam reflector film passes through the quarter wave film and is rotated by the quarter wave film, first rotation occurring when the modulated light from the display panel passes through the quarter wave film to reach the curved reflector resulting in quarter-rotated modulated light, second rotation occurring when the quarter rotated modulated light reflecting from the curved reflector passes through the quarter wave film to reach the polarized beam reflector film thus resulting in half-rotated modulated light, the half-rotated modulated light is in the first direction and reflects on the polarized beam reflector film for viewing.

12. The display system recited in claim 11 further comprising a conic mirror for directing the light from the light source to the polarized beam reflector film.

13. The display system recited in claim 11 wherein the light source comprises light-emitting element and polarizing filter.

14. The display system recited in claim 13 wherein the light source further comprises recovery mirror and quarter wave film to recapture light.

15. The display system recited in claim 11 wherein the display panel is reflective micro LCD.

16. The display system recited in claim 11 wherein the curved reflector is polarization-maintaining reflector.

17. The display system recited in claim 11 wherein the quarter wave film is an optical element that introduces a relative phase shift of $\pi/2$ in polarization of light passing through the quarter wave film.

18. A display system comprising:

light source for supplying back lighting for a display panel, the backlight polarized in a first direction and modulated by passing through the display panel;

polarized beam reflector film (PBRF) allowing the modulated light to pass the PBRF toward a quarter wave plate and a curved reflector; and the quarter wave plate and the curved reflector operating to rotate the modulated light to light polarized in a second direction and directing the rotated light toward the PBRF such that the rotated light is reflected off the PBRF toward an imaging area.

19. The display system recited in claim 18 wherein the display panel is semitransparent.

20. The display system recited in claim 18 wherein the display panel pivotally attached to the PBRF.

* * * * *